(12) United States Patent
Xu et al.

(10) Patent No.: US 9,030,948 B2
(45) Date of Patent: May 12, 2015

(54) ENCODING AND DECODING OF CONTROL INFORMATION FOR WIRELESS COMMUNICATION

(75) Inventors: Hao Xu, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 12/407,161

(22) Filed: Mar. 19, 2009

(65) Prior Publication Data

US 2009/0245284 A1 Oct. 1, 2009

Related U.S. Application Data

(60) Provisional application No. 61/040,700, filed on Mar. 30, 2008.

(51) Int. Cl.
*H04L 12/28* (2006.01)
*H04L 1/00* (2006.01)
*H04L 1/16* (2006.01)

(52) U.S. Cl.
CPC ............ *H04L 1/0028* (2013.01); *H04L 1/0026* (2013.01); *H04L 1/0057* (2013.01); *H04L 1/0073* (2013.01); *H04L 1/1671* (2013.01)

(58) Field of Classification Search
None
See application file for complete search history.

(56) References Cited

U.S. PATENT DOCUMENTS

| 7,124,350 | B2* | 10/2006 | Chao et al. ............. 714/776 |
| 7,822,044 | B2 | 10/2010 | Lee et al. |
| 8,374,161 | B2 | 2/2013 | Malladi |
| 8,553,627 | B2* | 10/2013 | Yin et al. ............. 370/329 |
| 8,726,116 | B2* | 5/2014 | Hwang et al. ............. 714/748 |
| 8,830,925 | B2* | 9/2014 | Kim et al. ............. 370/329 |
| 2002/0093918 | A1 | 7/2002 | Kim et al. |
| 2004/0058687 | A1* | 3/2004 | Kim et al. ............. 455/452.2 |
| 2006/0039330 | A1* | 2/2006 | Hackett et al. ............. 370/335 |
| 2007/0097981 | A1 | 5/2007 | Papasakellariou |
| 2007/0133479 | A1 | 6/2007 | Montojo et al. |

(Continued)

FOREIGN PATENT DOCUMENTS

| EP | 1622329 A1 | 2/2006 |
| EP | 2075916 A1 | 7/2009 |

(Continued)

OTHER PUBLICATIONS

Lee, methods of joint coding in mobile communication system, filed Nov. 18, 2007, U.S. Appl. No. 60/988,809, pp. 1-23.*

(Continued)

*Primary Examiner* — Steven H Nguyen
(74) *Attorney, Agent, or Firm* — Larry Moskowitz

(57) ABSTRACT

Techniques for sending control information in a wireless communication system are described. In one design, a user equipment (UE) may map first information (e.g., CQI information) to M most significant bits (MSBs) of a message and may map second information (e.g., ACK information) to N least significant bits (LSBs) of the message if the second information is sent, where $M \geq 1$ and $N \geq 1$. The UE may encode the message with a block code, e.g., encode the M MSBs with the first M basis sequences of the block code and encode the N LSBs with the next N basis sequences of the block code. The second information may include NACK bits. The UE may set each ACK bit to a first value for an ACK or to a second value for a NACK. The second value may also be used for discontinuous transmission (DTX) of ACK information.

31 Claims, 11 Drawing Sheets

(56) References Cited

U.S. PATENT DOCUMENTS

| | | | |
|---|---|---|---|
| 2007/0183384 A1* | 8/2007 | Kwak et al. | 370/338 |
| 2008/0101303 A1* | 5/2008 | Kim | 370/335 |
| 2008/0219370 A1* | 9/2008 | Onggosanusi et al. | 375/260 |
| 2008/0225788 A1* | 9/2008 | Inoue et al. | 370/329 |
| 2009/0006925 A1* | 1/2009 | Pan | 714/758 |
| 2009/0207725 A1* | 8/2009 | Zhang | 370/203 |
| 2010/0272209 A1* | 10/2010 | Lee et al. | 375/295 |

FOREIGN PATENT DOCUMENTS

| | | |
|---|---|---|
| JP | 2004135287 A | 4/2004 |
| JP | 2010506495 A | 2/2010 |
| RU | 2262194 C2 | 10/2005 |
| RU | 2291591 C2 | 1/2007 |
| WO | 2006031070 A1 | 3/2006 |
| WO | 2007078146 A1 | 7/2007 |
| WO | WO2008042255 | 4/2008 |
| WO | WO2008115837 | 9/2008 |

OTHER PUBLICATIONS

Zhang, method of joint encoding multiple independent information messages, filed Feb. 11, 2008, U.S. Appl. No. 61/027,772 pp. 1-16.*
Zhang, method of joint encoding multiple independent information messages, filed Feb. 11, 2008, U.S. Appl. No. 61/040,607, pp. 1-13.*
Zhang, method of joint encoding multiple independent information messages, filed Feb. 11, 2008, U.S. Appl. No. 61/038,001, pp. 1-25.*
3GPP TS 36.212 V8.2.0 (Mar. 2008), 3rd Generation Partnership Project; Technical Specification Group Radio Access Network; Evolved Universal Terrestrial Radio Access (E-UTRA); Multiplexing and channel coding (Release 8), Section 5.2.3 (Mar. 2008).
International Search Report & Written Opinion—PCT/US2009/038679, International Search Authority—European Patent Office—Oct. 13, 2009.
LG Electronics: "On the design of CQI coding in PUCCH" 3GPP Draft; R1-080548_LG TFCI Based PUCCH, 3rd Generation Partnership Project (3GPP), Mobile Competence Centre ; 650, Route Des Lucioles ; F-06921 Sophia-Antipolis Cedex; France, vol. RAN WG1, no. Sevilla, Spain; Jan. 19, 2008, XP050109057 [retrieved on Jan. 19, 2008] sections 1-3. (5Pages).
Nokia Siemens Networks et al: "Joint coding for CQI+ACK/NACK transmission on PUCCH for extended cyclic prefix" 3GPP Draft; RI-080307, 3rd Generation Partnership Project (3GPP), Mobile Competence Centre ; 650, Route Des Lucioles ; F-06921 Sophia-Antipolis Cedex ; France, vol. RAN WG1, no. Sevilla, Spain; Jan. 8, 2008, XP050108828 [retrieved on Jan. 8, 2008] the whole document.
Qualcomm Europe: "Proposed Structure for UL ACK and CQI" 3GPP Draft; RI-070437, 3rd Generation Partnership Project (3GPP), Mobile Competence Centre ; 650, Route Des Lucioles ; F-06921 Sophia-Antipolis Cedex; France, vol. RAN WG1, no. Sorrento, Italy; Jan. 10, 2007, XP050104468 [retrieved on Jan. 10, 2007] the whole document.
3GPP TR 25.858 V. 5.0.0 (Mar. 2002_"Technical Specification Group Radio Access Network; High Speed Downlink Packet Access: Physical Layer Aspects (Release 5)" Mar. 2002, 3rd Generation Partnership Project 3GPP , 650 Route Des Lucioles—Sophia Antipolis, Balb0nne, France , XP002548418 section 8.2.2.1. (31 Pages).
Motorola : "Performance of RS Embedded ACK/NACK", 3GPP TSG-RAN WG1#51b, R1-080083, Jan. 2008. <URL:http://www.3gpp.org/ftp/tsg_ran/WG1_RL1/TSGR1_51b/Docs/R1-080083.zip>.
Taiwan Search Report—TW098110484—TIPO—Jan. 1, 2013.
Nokia Siemens Networks, Nokia,CQI+Ack/Nack Subcode details[online], 3GPP TSG-RAN WG1#52b R1-081459, internet <URL:http://www.3gpp.org/ftp/tsg_ran/WG1_RL1/TSGR1_52b/Docs/R1-081459.zip>, Mar. 26, 2011.
ZTE,ACK/CQI Joint Encoding on PUCCH with Normal CP[online], 3GPP TSG-RAN WG1#52b R1-081414, internet <URL:http://www.3gpp.org/ftp/tsg_ran/WG1_RL1/TSGR1_52b/Docs /R1-081414.zip>, Mar. 26, 2008.
Qualcom Europe, "Coding of HS-DPCCH to support operation of FDD MIMO", 3GPP 25.212 TSG-RAN WG1#47, V7.2.0 R1-063581, Nov. 6, 2006, URL,http://www.3gpp.org/ftp/tsg_ran/WG1_RL1/TSGR1_47/Docs/R1-063581.zip.
LG Electronics: Texas Instruments,Way Forward on PUCCH CQI coding[online],3GPP TSG-RAN WG1#51b R1-080575, pp. 2, http://www.3gpp.org/ftp/tsg_ran/WG1_RL1/TSGR1_51b/Docs/R1-080575.zip.
ZTE,ACK/CQI Joint Encoding on PUCCH with Extended CP[online],3GPP TSG-RAN WG1#52b R1-081413 http://www.3gpp.org/ftp/tsg_ran/WG1_RL1/TSGR1_52b/Docs/R1-081413.zip Mar. 26, 2008, pp. 1-46.

* cited by examiner

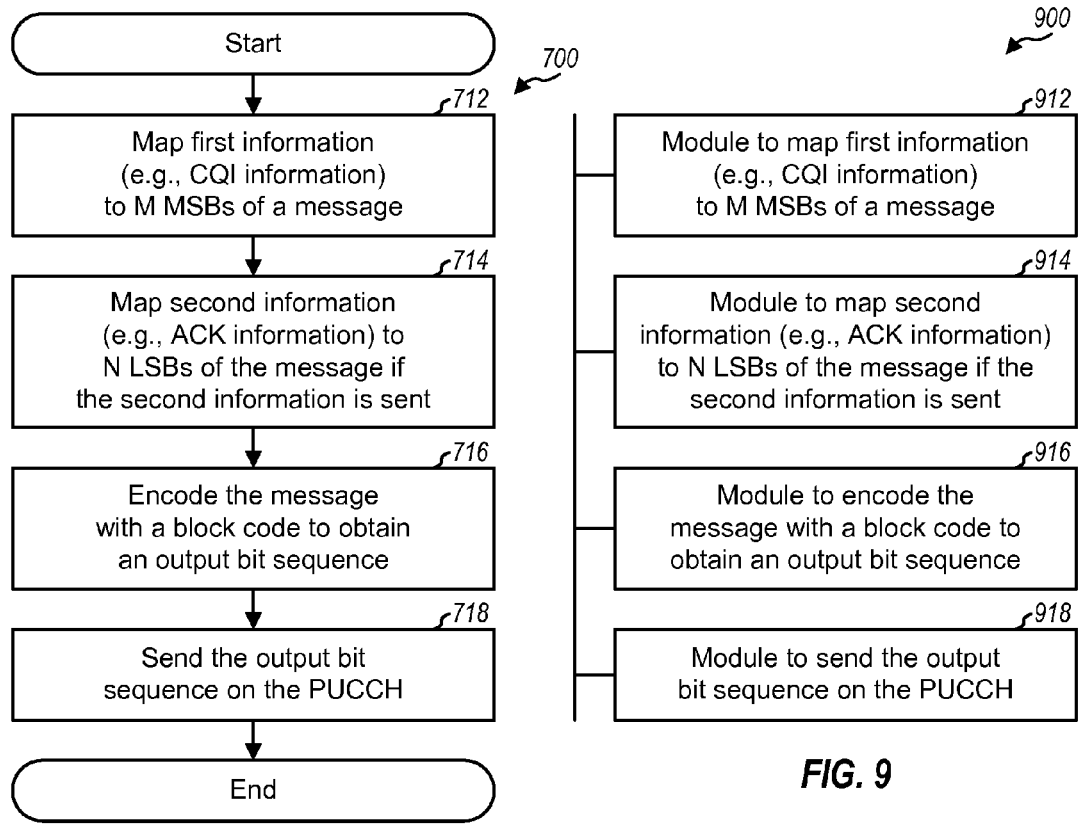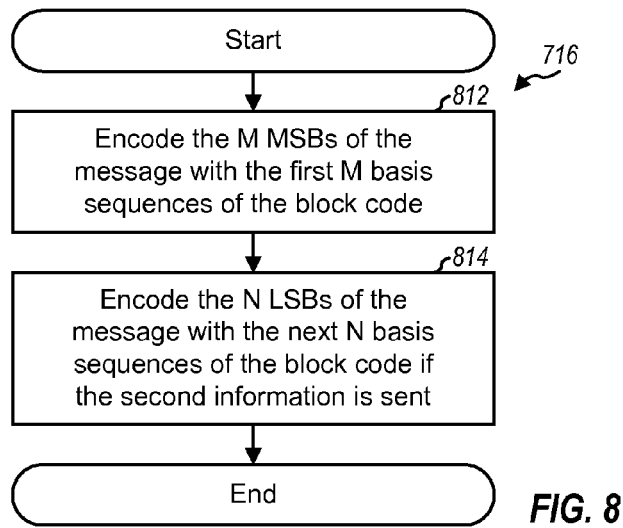

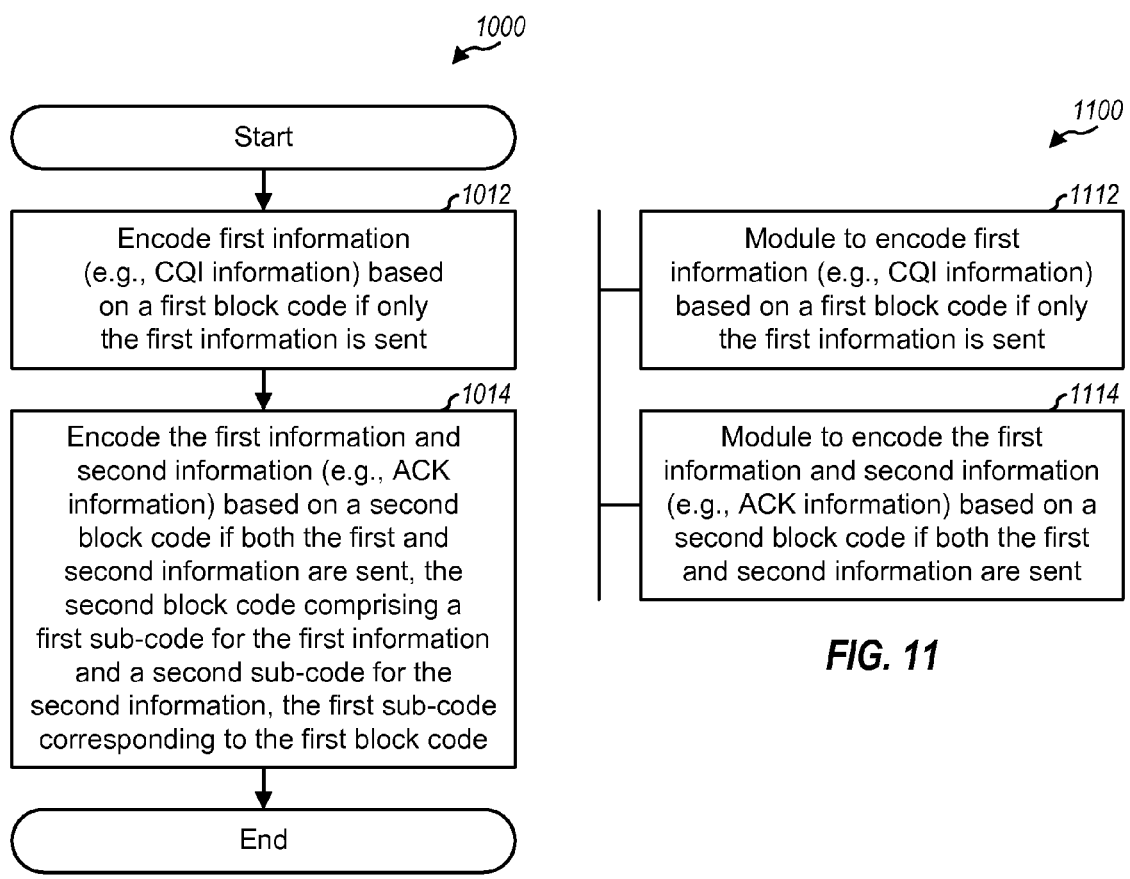

US 9,030,948 B2

ENCODING AND DECODING OF CONTROL INFORMATION FOR WIRELESS COMMUNICATION

The present application claims priority to provisional U.S. Application Ser. No. 61/040,700, entitled "DISCONTINUOUS TRANSMISSION DETECTION IN JOINT ACKNOWLEDGEMENT AND CHANNEL QUALITY INDICATION TRANSMISSION IN PHYSICAL UPLINK CONTROL CHANNEL FOR EXTENDED CYCLIC PREFIX," filed Mar. 30, 2008, assigned to the assignee hereof and incorporated herein by reference.

BACKGROUND

I. Field

The present disclosure relates generally to communication, and more specifically to techniques for encoding and decoding control information in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of Node Bs that can support communication for a number of user equipments (UEs). A Node B may transmit data to a UE on the downlink and/or may receive data from the UE on the uplink. The downlink (or forward link) refers to the communication link from the Node B to the UE, and the uplink (or reverse link) refers to the communication link from the UE to the Node B. The UE may send channel quality indicator (CQI) information indicative of the downlink channel quality to the Node B. The Node B may select a rate based on the CQI information and may send data at the selected rate to the UE. The UE may send acknowledgement (ACK) information for data received from the Node B. The Node B may determine whether to retransmit pending data or to transmit new data to the UE based on the ACK information. It is desirable to reliably send and receive ACK and CQI information in order to achieve good performance.

SUMMARY

Techniques for sending control information, such as CQI and ACK information, in a wireless communication system are described herein. In an aspect, a transmitter (e.g., a UE) may encode one or more types of information based on a linear block code and may order the different types of information such that a receiver can recover the information even in the presence of discontinuous transmission (DTX) of one type of information.

In one design, a UE may map first information (e.g., CQI information) to M most significant bits (MSBs) of a message, where M≥1. The UE may map second information (e.g., ACK information) to N least significant bits (LSBs) of the message if the second information is sent, where N≥1. The message may thus include only the first information or both the first and second information. The UE may encode the message with a block code to obtain an output bit sequence. In one design, the block code may be derived based on a Reed-Muller code and may comprise multiple basis sequences for multiple information bits. The UE may encode the M MSBs of the message with the first M basis sequences of the block code. The UE may encode the N LSBs of the message with the next N basis sequences of the block code if the second information is sent.

The second information may comprise N bits for ACK information. In one design, the UE may set each bit to a first value (e.g., '1') for an ACK or to a second value (e.g., '0') for a negative acknowledgement (NACK). The second value may also be used for DTX of ACK information. This design may allow a Node B to detect NACK if the UE misses a downlink transmission from the Node B and sends DTX for ACK information. The Node B may then resend data to the UE, which may be the desired response.

Various aspects and features of the disclosure are described in further detail below.

BRIEF DESCRIPTION OF THE DRAWINGS

FIGS. 7 and 10 show two processes for sending control information.
FIG. 8 shows a process for encoding control information.
FIGS. 9 and 11 show two apparatuses for sending control information.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
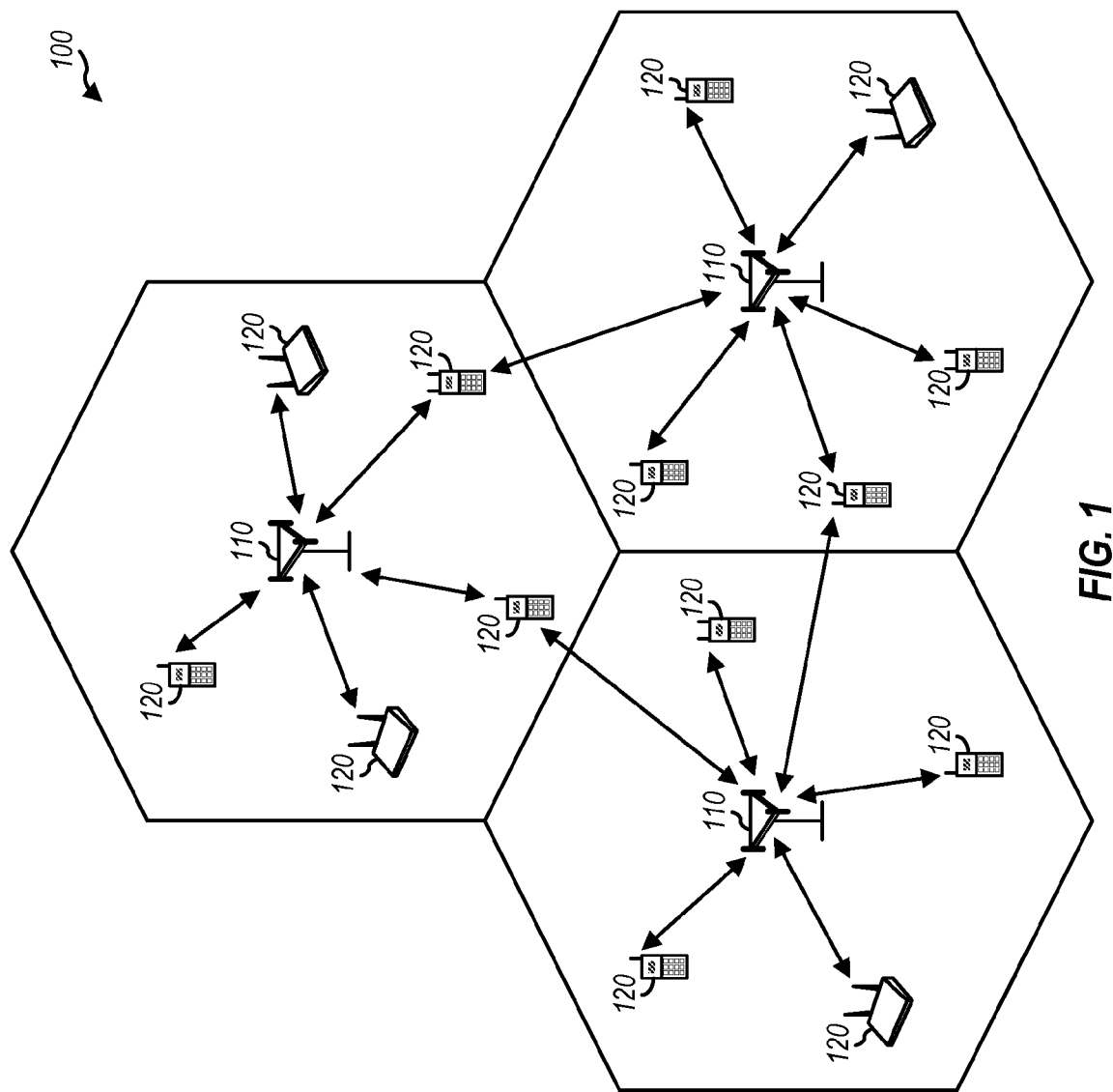
FIG. 1 shows a wireless communication system.

FIG. 1 shows a wireless communication system 100, which may be an LTE system. System 100 may include a number of Node Bs 110 and other network entities. A Node B may be a station that communicates with the UEs and may also be referred to as an evolved Node B (eNB), a base station, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc.

The system may support hybrid automatic retransmission (HARQ). For HARQ on the downlink, a Node B may send a transmission of data and may send one or more retransmissions until the data is decoded correctly by a recipient UE, or the maximum number of retransmissions has been sent, or some other termination condition is encountered. HARQ may improve reliability of data transmission.

Figure 2:
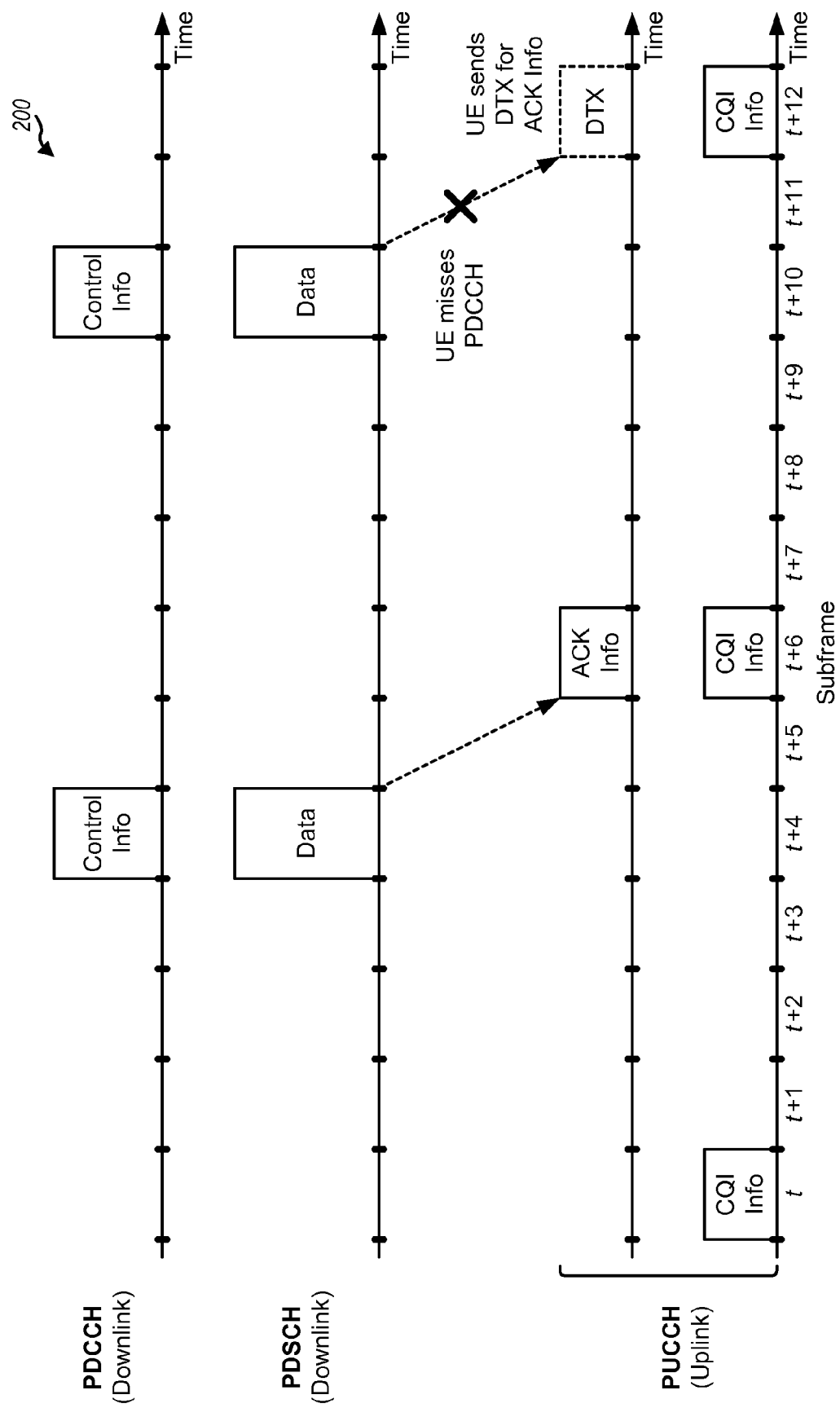
FIG. 2 shows example transmissions on the downlink and uplink.

FIG. 2 shows example downlink transmission by a Node B and example uplink transmission by a UE. The transmission timeline may be partitioned into units of subframes. Each subframe may have a particular duration, e.g., one millisecond (ms). The UE may periodically estimate the downlink channel quality for the Node B and may send CQI information on a physical uplink control channel (PUCCH) to the Node B. In the example shown in FIG. 2, the UE may send CQI information periodically in every sixth subframe, e.g., subframes t, t+6, t+12, etc.

The Node B may use the CQI information and/or other information to select the UE for downlink transmission and to select a suitable transport format (e.g., a modulation and coding scheme) for the UE. The Node B may process a transport block in accordance with the selected transport format and obtain a codeword. A transport block may also be referred to as a packet, etc. The Node B may send control information on a physical downlink control channel (PDCCH) and a transmission of the codeword on a physical downlink shared channel (PDSCH) to the UE in subframe t+4. The control information may comprise the selected transport format, the resources used for the data transmission on the PDSCH, and/or other information. The UE may process the PDCCH to obtain the control information and may process the PDSCH in accordance with the control information to decode the codeword. The UE may generate ACK information, which may comprise an ACK if the codeword is decoded correctly or a NACK if the codeword is decoded in error. The UE may send the ACK information on the PUCCH in subframe t+6. The Node B may send a retransmission of the codeword if a NACK is received and may send a transmission of a new codeword if an ACK is received. FIG. 2 shows an example in which the ACK information is delayed by two subframes from the codeword transmission. The ACK information may also be delayed by some other amount.

In the example shown in FIG. 2, the Node B may send control information on the PDCCH and a re/transmission of a codeword on the PDSCH in subframe t+10. The UE may miss the control information sent on the PDCCH (e.g., decode the control information in error) and would then miss the data transmission sent on the PDSCH. The UE may then send DTX (i.e., nothing) for ACK information in subframe t+12. The Node B may expect to receive CQI and ACK information in subframe t+12. The Node B may receive DTX for the ACK information, interpret the DTX as NACK, and send a retransmission of the codeword.

As shown in FIG. 2, the UE may send CQI and/or ACK information on the PUCCH. The ACK information may convey whether each transport block sent by the Node B to the UE is decoded correctly or in error by the UE. The amount of ACK information to send by the UE may be dependent on the number of transport blocks sent to the UE. In one design, the ACK information may comprise one or two ACK bits depending on whether one or two transport blocks are sent to the UE. In other designs, the ACK information may comprise more ACK bits. The CQI information may convey the downlink channel quality estimated by the UE for the Node B. The CQI information may comprise one or more quantized values for a channel quality metric such as signal-to-noise ratio (SNR), signal-to-noise-and-interference ratio (SINR), etc. The CQI information may also comprise one or more transport formats determined based on the channel quality metric. In any case, the amount of CQI information to send by the UE may be dependent on various factors such as the number of spatial channels available for downlink transmission, the format for reporting the downlink channel quality, the desired granularity of the reported downlink channel quality, etc. In one design, the CQI information may comprise 4 to 11 bits. In other designs, the CQI information may comprise fewer or more bits.

As shown in FIG. 2, the UE may send only CQI information or both CQI and ACK information on the PUCCH in a given subframe. The UE may send CQI information at a periodic rate and in specific subframes, which may be known by both the UE and the Node B. The UE may send only CQI information when there is no ACK information to send, e.g., in subframe t in FIG. 2. The UE may also send only CQI information when the UE misses the PDCCH and sends DTX for ACK information, e.g., in subframe t+12 in FIG. 2. The UE may send both CQI and ACK information when the UE receives the PDCCH and decodes the PDSCH, e.g., in subframe t+6 in FIG. 2. The UE may also send only ACK information, which is not shown in FIG. 2.

The UE may encode only CQI information or both CQI and ACK information in various manners. In general, it may be desirable for the UE to encode and send only CQI information or both CQI and ACK information such that the Node B can reliably receive the information sent by the UE.

In an aspect, the UE may encode only CQI information or both CQI and ACK information based on a linear block code. The UE may order the different types of information to send such that the Node B can recover the information even in the presence of DTX of one type of information, as described below.

The CQI information may comprise M bits, where M may be any suitable value and $M \leq 11$ in one design. The ACK information may comprise N bits, where N may also be any suitable value and $N \leq 2$ in one design. In one design, only CQI information or both CQI and ACK information may be encoded based on a (20, L) block code, which may be derived from a (32, 6) Reed-Muller code, where $L \geq M+N$.

In general, an (R, C) Reed-Muller code may be used to encode up to C information bits and generate R code bits. The (R, C) Reed-Muller code may be defined by an R×C generator matrix $G_{R \times C}$ having R rows and C columns. A generator matrix $G_{2 \times 2}$ for a (2, 2) Reed-Muller code with R=2 and C=2 may be given as:

$$G_{2\times 2} = \begin{bmatrix} 1 & 1 \\ 1 & 0 \end{bmatrix}. \quad \text{Eq (1)}$$

A generator matrix $G_{2R\times C+1}$ for a (2R, C+1) Reed-Muller code may be given as:

$$G_{2R\times C+1} = \begin{bmatrix} G_{R\times C} & 1 \\ G_{R\times C} & 0 \end{bmatrix}, \quad \text{Eq (2)}$$

where 1 is an R×1 vector of all ones, and 0 is an R×1 vector of all zeros.

A (32, 6) Reed-Muller code may be defined by a generator matrix $G_{32\times 6}$, which may be generated based on equations (1) and (2). The 6 columns of generator matrix $G_{32\times 6}$ may be denoted as $v_0$ through $v_5$. A (32, 21) second-order Reed-Muller code may be defined by a generator matrix $G_{32\times 21}$ containing the six columns of $G_{32\times 6}$ and 15 additional columns generated by linear combination of different possible pairs of columns of $G_{32\times 6}$. For example, the seventh column of $G_{32\times 21}$ may be generated based on $v_0$ and $v_1$, the eighth column may be generated based on $v_0$ and $v_2$, and so on, and the last column may be generated based on $v_4$ and $v_5$.

The (20, L) block code may be obtained by taking 20 rows and L columns of the (32, 21) second-order Reed-Muller code, where L may be any suitable value. The (20, L) block code may be defined by a generator matrix $G_{20\times L}$ having 20 rows and L columns. Each column of $G_{20\times L}$ is a basis sequence of length 20 and may be used to encode one information bit. Table 1 shows a generator matrix $G_{20\times 13}$ for a (20, 13) block code for a case in which L=13.

A message of K information bits may be defined based on only CQI information or both CQI and ACK information. The message may also be referred to as a word, input data, etc. In one coding design, CQI information may be mapped to M MSBs and ACK information may be mapped to N LSBs of the message, as follows:

If only CQI information is sent:

$$a_k = a'_k \text{ for } k=0,\ldots,M-1, \text{ with } K=M, \text{ and} \quad \text{Eq (3)}$$

If both CQI and ACK information are sent:

$$a_k = a'_k \text{ for } k=0,\ldots,M-1,$$

$$a_{k+M} = a''_k \text{ for } k=0,\ldots,N-1, \text{ with } K=M+N, \quad \text{Eq (4)}$$

where
$a'_k$ is the k-th CQI bit, with k=0, ..., M−1,
$a''_k$ is the k-th ACK bit, with k=0, ..., N−1, and
$a_0$ is the MSB and $a_{K-1}$ is the LSB of the message.

The message includes K information bits $a_0$ through $a_{K-1}$, where K=M if only CQI information is sent and K=M+N if both CQI and ACK information are sent. The K information bits in the message may be encoded with a (20, K) block code as follows:

$$b_i = \sum_{k=0}^{K-1} (a_k \cdot M_{i,k}) \bmod 2, \quad \text{for } i=0,\ldots,19, \quad \text{Eq (5)}$$

where $b_i$ denotes the i-th code bit and "mod" denotes a modulo operation. The (20, K) block code may be formed with the first K basis sequences or columns of the (20, L) block code.

As shown in equation (5), each information bit $a_k$ may be encoded by multiplying $a_k$ with each element $M_{i,k}$ of a basis sequence for that information bit to obtain an encoded basis sequence. K encoded basis sequences for the K information bits may be combined with modulo-2 addition to obtain an output bit sequence (or codeword) composed of coded bits $b_0$ through $b_{19}$.

For the coding design shown in equations (3) to (5), if only CQI information is sent, then M CQI bits may be encoded with a (20, M) block code formed by the first M basis sequences of the (20, L) block code. If both CQI and ACK information are sent, then M CQI bits and N ACK bits may be encoded with a (20, M+N) block code formed by the first M+N basis sequences of the (20, L) block code. The M CQI bits may be encoded with the first M basis sequences and the N ACK bits may be encoded with the next N basis sequences of the (20, L) block code.

TABLE 1

Basis sequences for (20, 13) block code

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 0 | 1 | 0 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |
| bit | $a_0$ | $a_1$ | $a_2$ | $a_3$ | $a_4$ | $a_5$ | $a_6$ | $a_7$ | $a_8$ | $a_9$ | $a_{10}$ | $a_{11}$ | $a_{12}$ |

In one ACK mapping design, an ACK bit may be defined as follows:

$$a_k'' = \begin{cases} 1 & \text{ACK for a transport block} \\ 0 & \text{NAK for a transport block or DTX} \end{cases} \quad \text{Eq (6)}$$

where $a''_k$ is the k-th ACK bit for the k-th transport block, with $k=0, \ldots, N-1$.

Figure 3:
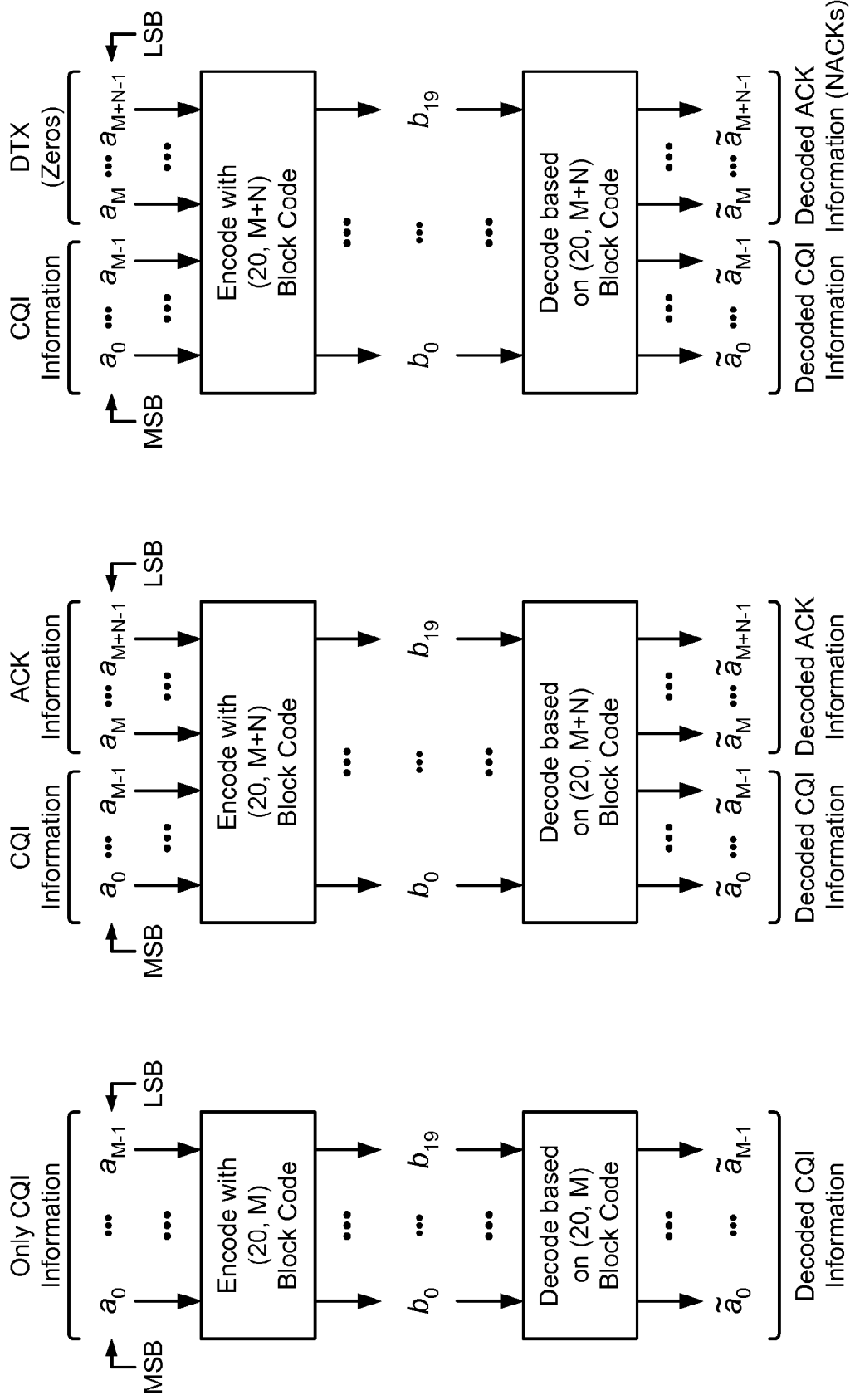
FIGS. 3A to 3C show transmission of CQI and ACK information.

FIG. 3A shows transmission of only CQI information in accordance with the coding and mapping designs described above. The UE may map M bits for CQI information to bits $a_0$ through $a_{M-1}$ of a message, with $a_0$ being the MSB and $a_{M-1}$ being the LSB. The UE may encode bits $a_0$ through $a_{M-1}$ with the (20, M) block code formed by the first M basis sequences of the (20, L) block code and may obtain 20 code bits $b_0$ through $b_{19}$. The UE may send the code bits on the PUCCH. The Node B may expect to receive only CQI information and may decode the PUCCH transmission in accordance with the (20, M) block code. The Node B may perform maximum likelihood decoding or may implement some other decoding algorithm. The Node B may obtain M decoded bits $\tilde{a}_1$ through $\tilde{a}_{M-1}$ and may interpret these decoded bits as CQI bits.

FIG. 3B shows transmission of both CQI and ACK information in accordance with the coding and mapping designs described above. The UE may map M bits for CQI information to bits $a_0$ through $a_{M-1}$ and may map N bits for ACK information to bits $a_M$ through $a_{M+N-1}$ of a message, with $a_0$ being the MSB and $a_{M+N-1}$ being the LSB. The UE may encode bits $a_0$ through $a_{M+N-1}$ with the (20, M+N) block code formed by the first M+N basis sequences of the (20, L) block code and may obtain code bits $b_0$ through $b_{19}$. The UE may send the code bits on the PUCCH. The Node B may expect to receive both CQI and ACK information and may decode the PUCCH transmission in accordance with the (20, M+N) block code. The Node B may obtain M+N decoded bits $\tilde{a}_1$ through $\tilde{a}_{M+N-1}$. The Node B may interpret the first M decoded bits $\tilde{a}_1$ through $\tilde{a}_{M-1}$ as CQI bits and may interpret the last N decoded bits $\tilde{a}_M$ through $\tilde{a}_{M+N-1}$ as ACK bits.

FIG. 3C shows transmission of CQI information and DTX for ACK information in accordance with the coding and mapping designs described above. The UE may miss the PDCCH and may send only CQI information by (i) mapping M bits for CQI information to bits $a_0$ through $a_{M-1}$ of a message and (ii) encoding bits $a_0$ through $a_{M-1}$ with the (20, M) block code, as shown in FIG. 3A. This is equivalent to the UE sending CQI information and DTX for ACK information by (i) mapping M bits for CQI information to bits $a_0$ through $a_{M-1}$, (ii) mapping N zeros to bits $a_M$ through $a_{M+N-1}$, and (iii) encoding bits $a_0$ through $a_{M+N-1}$ with the (20, M+N) block code to obtain code bits $b_0$ through $b_{19}$, as shown in FIG. 3C. The code bits $b_0$ through $b_{19}$ in FIG. 3C are equal to the code bits $b_0$ through $b_{19}$ in FIG. 3A. The UE may send the code bits on the PUCCH. The Node B may expect to receive both CQI and ACK information and may decode the PUCCH transmission in accordance with the (20, M+N) block code. The Node B may obtain M+N decoded bits $\tilde{a}_1$ through $\tilde{a}_{M+N-1}$. The Node B may interpret the first M decoded bits $\tilde{a}_1$ through $\tilde{a}_{M-1}$ as CQI bits and may interpret the last N decoded bits $\tilde{a}_M$ through $\tilde{a}_{M+N-1}$ as ACK bits. Since the UE sent DTX for the N ACK bits, the Node B would receive NACKs for the ACK bits due to the mapping shown in equation (6).

The coding and mapping designs described above and shown in FIGS. 3A to 3C may allow the Node B to correctly recover CQI information and properly respond to DTX even in a scenario in which the UE misses the PDCCH and transmits only CQI information using the (20, M) block code. In particular, transmitting M CQI bits using the (20, M) block code in FIG. 3A is equivalent to transmitting M CQI bits and N zeros using the (20, M+N) block code in FIG. 3C. The Node B may decode the PUCCH transmission using the (20, M+N) block code when the Node B expects to receive both CQI and ACK information and may obtain M+N decoded bits. The Node B may interpret the M decoded MSBs as being for CQI information and the N decoded LSBs as being for ACK information. If the UE transmits DTX for ACK information, then the Node B would obtain zeros for the N decoded LSBs (assuming correct decoding by the Node B). The Node B may interpret these zeros as NACKs and may send a retransmission to the UE, which would be the desired Node B response for the DTX from the UE.

Figure 4:
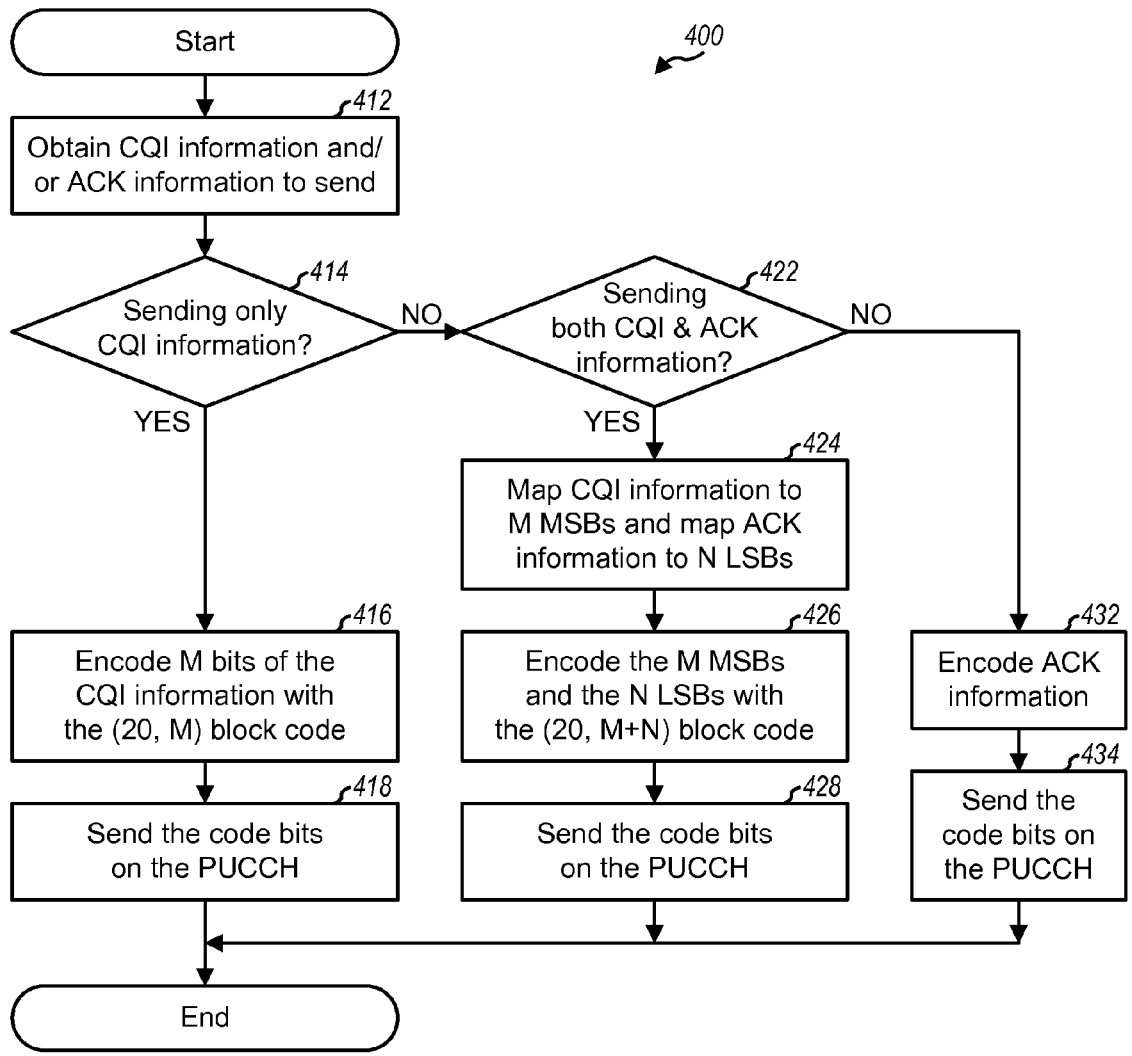
FIG. 4 shows a process performed by a UE to send control information.

FIG. 4 shows a design of a process 400 performed by the UE for sending feedback control information on the PUCCH. The UE may obtain CQI information and/or ACK information to send (block 412). The UE may determine whether only CQI information is being sent (block 414). If the answer is 'Yes', then the UE may encode M bits of the CQI information with the (20, M) block code (block 416) and may send the code bits on the PUCCH (block 418).

If the answer is 'No' for block 414, then the UE may determine whether both CQI and ACK information are being sent (block 422). If the answer is 'Yes', then the UE may map CQI information to M MSBs and may map ACK information to N LSBs of a message (block 424). The UE may then encode the M MSBs and the N LSBs with the (20, M+N) block code (block 426) and may send the code bits on the PUCCH (block 428).

If the answer is 'No' for block 422, then only ACK information is being sent. The UE may encode the ACK information (block 432) and may send the code bits on the PUCCH (block 434).

Figure 5:
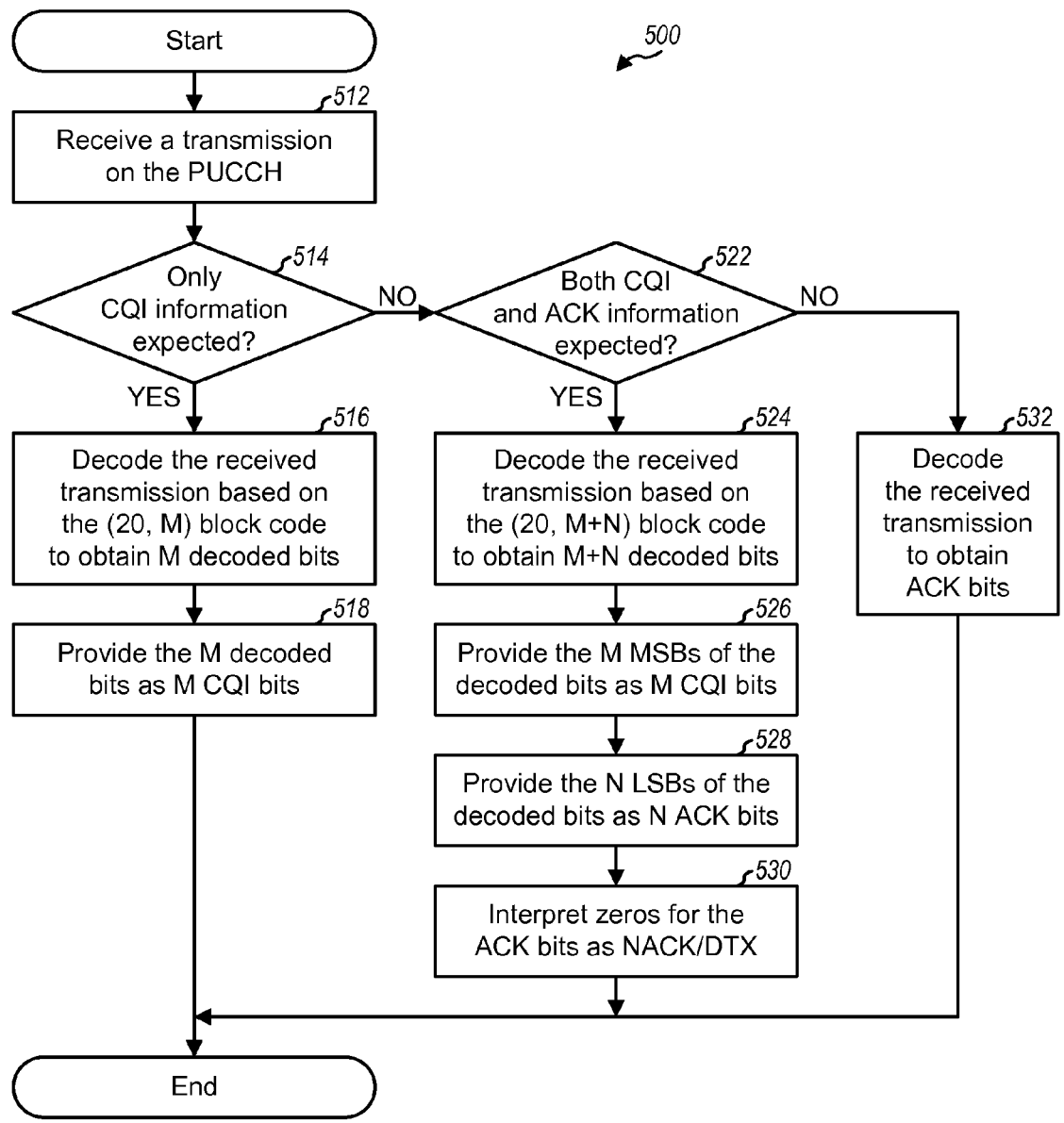
FIG. 5 shows a process performed by a Node B to receive control information.

FIG. 5 shows a design of a process 500 performed by the Node B to receive feedback control information from the UE. The Node B may receive a transmission on the PUCCH from the UE (block 512). The Node B may determine whether only CQI information is expected from the UE (block 514). If the answer is 'Yes' for block 514, which may be the case if no data has been sent to the UE, then the Node B may decode the received transmission based on the (20, M) block code to obtain M decoded bits (block 516). The Node B may provide these M decoded bits as M CQI bits (block 518).

If the answer is 'No' for block 514, then the Node B may determine whether both CQI and ACK information are expected from the UE (block 522). If the answer is 'Yes' for block 522, which may be the case if data has been sent to the UE, then the Node B may decode the received transmission based on the (20, M+N) block code to obtain M+N decoded bits (block 524). The Node B may provide the M MSBs of the decoded bits as M CQI bits (block 526) and may provide the N LSBs of the decoded bits as N ACK bits (block 528). The Node B may interpret zeros for the ACK bits as NACK/DTX (block 530). If the answer is 'No' for block 522, then the Node B may decode the received transmission to obtain ACK bits (block 532).

The coding and mapping designs shown in FIGS. 3A to 5 may avoid decoding errors due to transmission of DTX for ACK information. Decoding errors may occur in an alternate design in which ACK information is mapped to N MSBs and CQI information is mapped to M LSBs (which is opposite of the coding design shown in FIGS. 3A to 3C). In this alternate design, if only CQI information is sent, then M CQI bits may be encoded with the first M basis sequences of the (20, L) block code. If both CQI and ACK information are sent, then N ACK bits may be encoded with the first N basis sequences and M CQI bits may be encoded with the next M basis sequences of the (20, L) block code. The UE may miss the PDCCH and may send only CQI information using the (20, M) block code formed by the first M basis sequences of the (20, L) block code. The Node B may expect both CQI and ACK information and may decode based on the (20, N+M) block code formed by the first N+M basis sequences of the (20, L) block code. The Node B may obtain N decoded bits for the first N basis sequences and may interpret these N decoded bits as being for ACK information. The Node B may obtain M decoded bits for the next M basis sequences and may interpret these M decoded bits as being for CQI information. The Node B may obtain erroneous ACK information since the N decoded bits interpreted as ACK bits are actually N MSBs of the CQI information sent by the UE. The Node B may also obtain erroneous CQI information since the M decoded bits interpreted as CQI bits are actually M-N LSBs of the CQI information and N bits of DTX. The design in FIGS. 3A to 5 may avoid these errors.

Computer simulations were performed to determine decoding performance for (i) a first mapping scheme with CQI information mapped to MSBs and ACK information mapped to LSBs (e.g., as shown in FIG. 3B) and (ii) a second mapping scheme with ACK information mapped to MSBs and CQI information mapped to LSBs (the alternate design). The results of the computer simulations are summarized by the following plots.

Figure 6A:
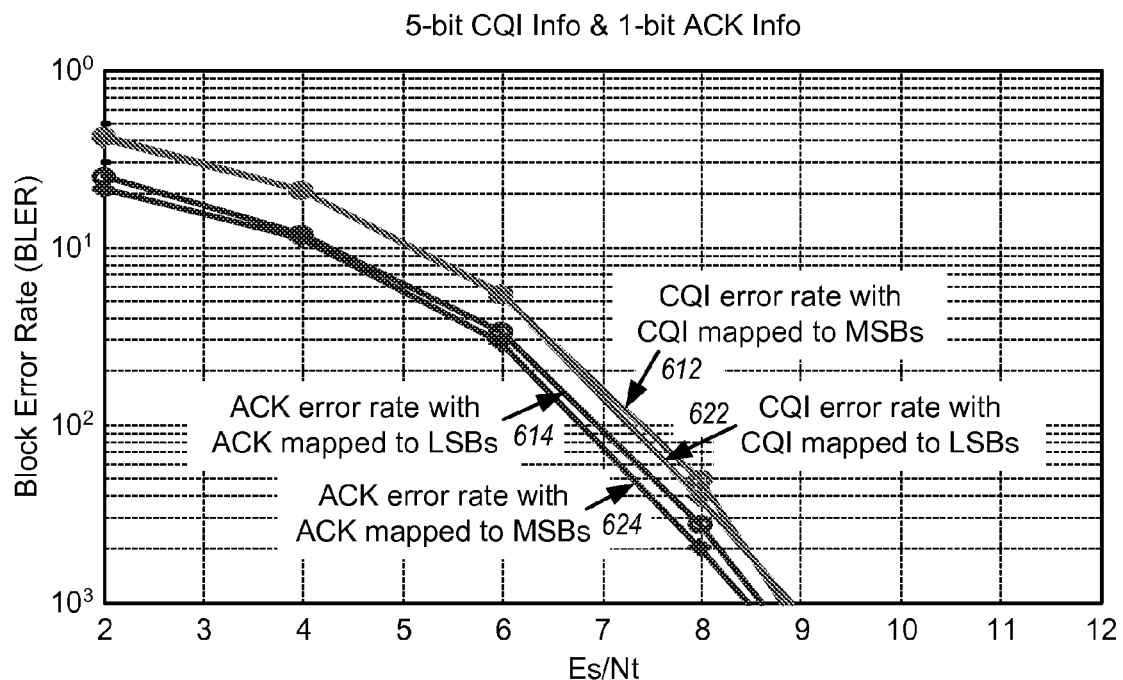
FIGS. 6A and 6B show plots of decoding performance.

FIG. 6A shows plots of decoding performance for the first and second mapping schemes for a scenario with 5 CQI bits and 1 ACK bit using a (20, 6) block code formed with the first six basis sequences of the (20, 13) block code. The horizontal axis represents received signal quality, which is given in energy-per-symbol-to-total-noise ratio (Es/Nt). The vertical axis represents block error rate (BLER). For the first mapping scheme, decoding performance for CQI information is shown by a plot 612, and decoding performance for ACK information is shown by a plot 614. For the second mapping scheme, decoding performance for CQI information is shown by a plot 622, and decoding performance for ACK information is shown by a plot 624.

Figure 6B:
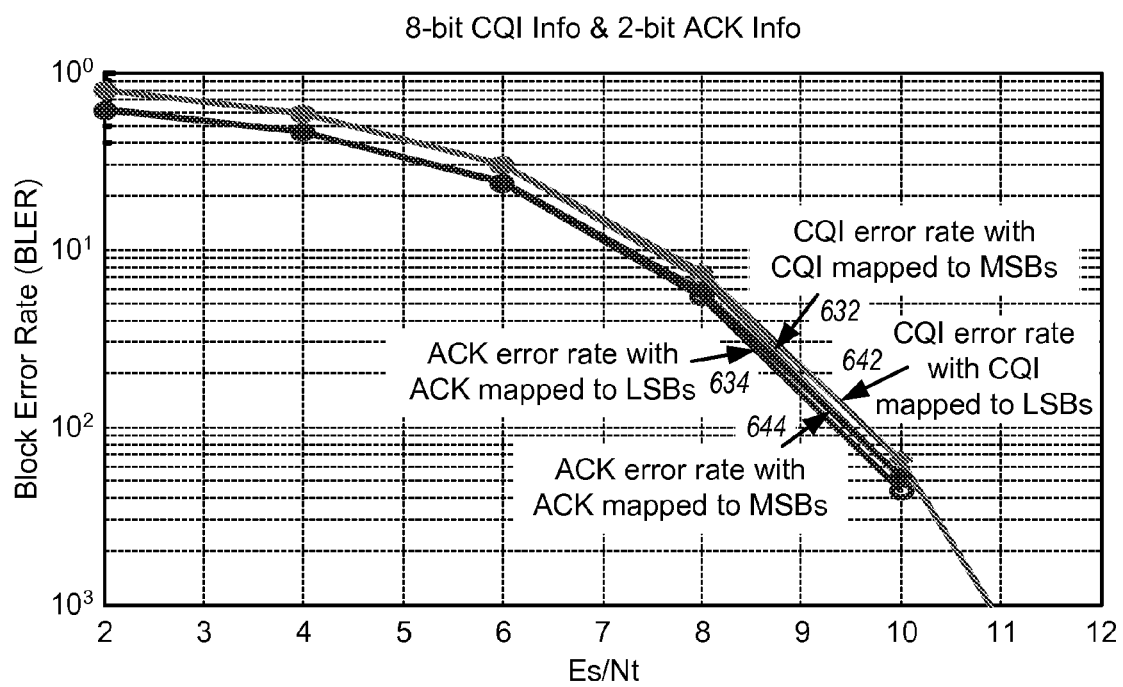

FIG. 6B shows plots of decoding performance for the first and second mapping schemes for a scenario with 8 CQI bits and 2 ACK bit using a (20, 10) block code formed with the first ten basis sequences of the (20, 13) block code. For the first mapping scheme, decoding performance for CQI information is shown by a plot 632, and decoding performance for ACK information is shown by a plot 634. For the second mapping scheme, decoding performance for CQI information is shown by a plot 642, and decoding performance for ACK information is shown by a plot 644.

As shown in FIGS. 6A and 6B, similar decoding performance may be obtained for the two mapping schemes. The computer simulations indicate that mapping the ACK information to LSBs or MSBs provide similar decoding performance using the (20, 13) block code in an additive white Gaussian noise (AWGN) channel. The computer simulations suggest that the (20, 13) block code provides equivalent protection for all information bits and that mapping ACK information to either the MSBs or LSBs minimally affect decoding performance.

For clarity, the techniques have been specifically described above for a block code derived based on a Reed-Muller code. The techniques may also be used for other types of block codes such as Reed-Solomon code, etc.

Also for clarity, the techniques have been described above for transmission of only CQI information or both CQI and ACK information. In general, the techniques may be used to send first information and second information, each of which may be any type of information. The first information may be mapped to M MSBs, where M≥1. The second information may be mapped to N LSBs if it is sent, where N≥1. The M MSBs and the N LSBs may be encoded with a block code comprising a first sub-code for the M MSBs and a second sub-code for the N LSBs. The first sub-code may be equal to the block code used to encode only the first information. This may allow a receiver to recover the first information regardless of whether it is sent alone or with the second information. The second information may also be defined such that DTX of the second information would result in proper action by the receiver.

FIG. 7 shows a design of a process 700 for sending information in a communication system. Process 700 may be performed by a UE (as described below) or by some other entity. The UE may map first information (e.g., CQI information) to M MSBs of a message, where M may be one or greater (block 712). The UE may map second information (e.g., ACK information) to N LSBs of the message if the second information is sent, where N may be one or greater (block 714). The first information may be sent alone or with the second information in the message. The second information may be sent with the first information or not sent in the message. The UE may encode the message with a block code to obtain an output bit sequence (block 716). The UE may send the output bit sequence on the PUCCH (block 718).

FIG. 8 shows a design of block 716 in FIG. 7. The block code may be derived based on a Reed-Muller code and/or may comprise a plurality of basis sequences for a plurality of information bits. The UE may encode the M MSBs of the message with the first M basis sequences of the block code (block 812). The UE may encode the N LSBs of the message with the next N basis sequences of the block code if the second information is sent (block 814).

In one design, if only CQI information is sent, then the message may comprise M bits and may be encoded with the first M basis sequences of the block code. If both CQI and ACK information are sent, then the message may comprise M plus N bits and may be encoded with the first M plus N basis sequences of the block code. In one design, the UE may set each of N ACK bits to a first value (e.g., '1') for an ACK or to a second value (e.g., '0') for a NACK. The second value may also be used for DTX of the ACK information. The ACK information may comprise the N ACK bits.

FIG. 9 shows a design of an apparatus 900 for sending information in a communication system. Apparatus 900 includes a module 912 to map first information to M MSBs of a message, a module 914 to map second information to N LSBs of the message if the second information is sent, a module 916 to encode the message with a block code to obtain an output bit sequence, and a module 918 to send the output bit sequence on the PUCCH.

FIG. 10 shows a design of a process 1000 for sending information in a communication system. Process 1000 may be performed by a UE (as described below) or by some other entity. The UE may encode first information (e.g., CQI information) based on a first block code if only the first information is sent (block 1012). The UE may encode the first information and second information (e.g., ACK information) based on a second block code if both the first and second information are sent (block 1014). The second block code may comprise a first sub-code for the first information and a second sub-code for the second information. The first sub-code may correspond to the first block code. For example, the first block code and the first sub-code may comprise the first M basis sequences of a base block code, the second sub-code may comprise the next N basis sequences of the base block code, and the second block code may comprise the first M plus N basis sequences of the base block code.

In one design, the UE may set each of N bits to a first value for an ACK or to a second value for a NACK, where N is one or greater. The second value may also be used for DTX of the second information. The second information may comprise the N bits.

FIG. 11 shows a design of an apparatus 1100 for sending information in a communication system. Apparatus 1100 includes a module 1112 to encode first information (e.g., CQI information) based on a first block code if only the first information is sent, and a module 1114 to encode the first information and second information (e.g., ACK information) based on a second block code if both the first and second information are sent. The second block code may comprise a first sub-code for the first information and a second sub-code for the second information. The first sub-code may correspond to the first block code.

Figure 12:
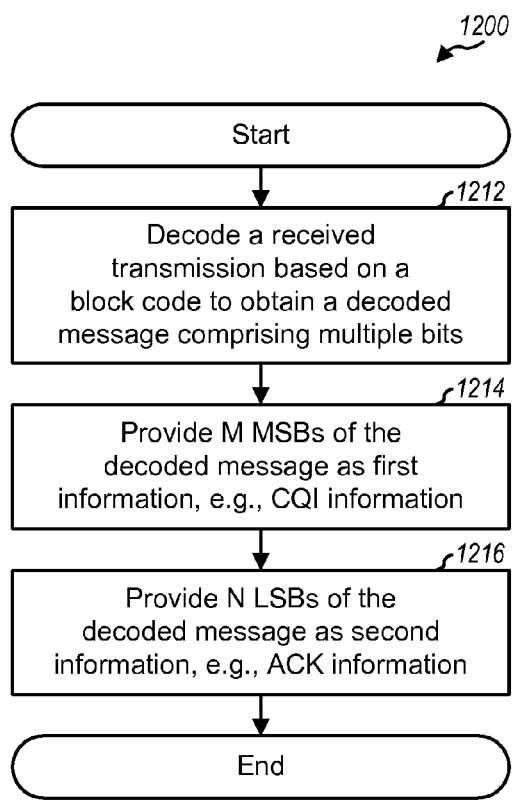
FIGS. 12 and 14 show two processes for receiving control information.

FIG. 12 shows a design of a process 1200 for receiving information in a communication system. Process 1200 may be performed by a Node B (as described below) or by some other entity. The Node B may decode a received transmission based on a block code to obtain a decoded message comprising multiple bits (block 1212). The Node B may provide M MSBs of the decoded message as first information (e.g., CQI information), where M may be one or greater (block 1214). The Node B may provide N LSBs of the decoded message as second information (e.g., ACK information), where N may be one or greater (block 1216). The received transmission may comprise only the first information or both the first and second information.

The block code may be derived based on a Reed-Muller code and/or may comprise a plurality of basis sequences for a plurality of information bits. In one design of block 1216, the Node B may decode the received transmission based on the first M plus N basis sequences of the block code to obtain the decoded message. The M MSBs of the decoded message may be obtained based on the first M basis sequences of the block code. The N LSBs of the decoded message may be obtained based on the next N basis sequences of the block code. In one design, for each bit among the N LSBs of the decoded message, the Node B may provide an ACK if the bit has a first value or a NACK if the bit has a second value. The second value may also be used for DTX of the ACK information.

In one design, the Node B may obtain the received transmission on the PUCCH. The received transmission may comprise a first output bit sequence if only CQI information is sent and may comprise a second output bit sequence if both CQI and ACK information are sent. The first output bit sequence may be obtained by encoding M bits of the CQI information with the first M basis sequences of the block code. The second output bit sequence may be obtained by encoding (i) M bits of the CQI information with the first M basis sequences of the block code and (ii) N bits of the ACK information with the next N basis sequences of the block code.

Figure 13:
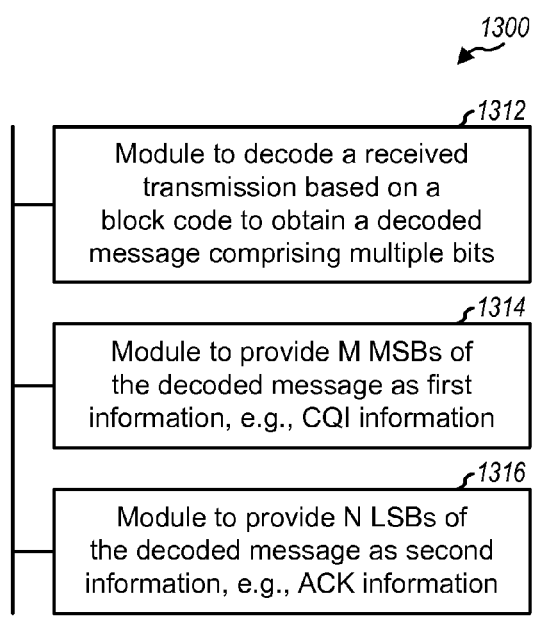
FIGS. 13 and 15 show two apparatuses for receiving control information.

FIG. 13 shows a design of an apparatus 1300 for receiving information in a communication system. Apparatus 1300 includes a module 1312 to decode a received transmission based on a block code to obtain a decoded message comprising multiple bits, a module 1314 to provide M MSBs of the decoded message as first information, and a module 1316 to provide N LSBs of the decoded message as second information. The received transmission may comprise only the first information or both the first and second information.

Figures 14, 15:
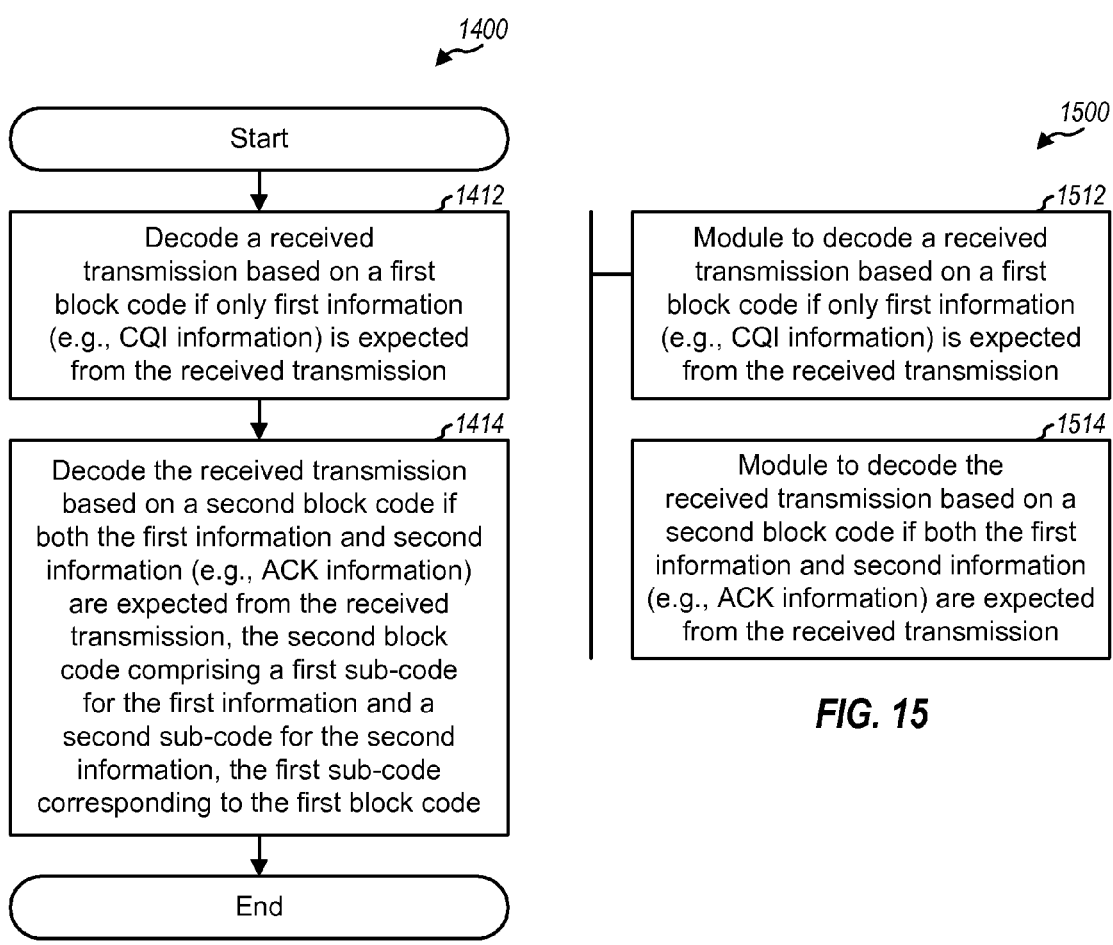

FIG. 14 shows a design of a process 1400 for receiving information in a communication system. Process 1400 may be performed by a Node B (as described below) or by some other entity. The Node B may decode a received transmission based on a first block code if only first information (e.g., CQI information) is expected from the received transmission (block 1412). The Node B may decode the received transmission based on a second block code if both the first information and second information (e.g., ACK information) are expected from the received transmission (block 1414). The second block code may comprise a first sub-code for the first information and a second sub-code for the second information. The first sub-code may correspond to the first block code.

In one design, if the second information is expected from the received transmission, then for each of at least one decoded bit for the second information, the Node B may provide an ACK if the bit has a first value or a NACK if the bit has a second value. The second value may also be used for DTX of the second information.

FIG. 15 shows a design of an apparatus 1500 for receiving information in a communication system. Apparatus 1500 includes a module 1512 to decode a received transmission based on a first block code if only first information (e.g., CQI information) is expected from the received transmission, and a module 1514 to decode the received transmission based on a second block code if both the first information and second information (e.g., ACK information) are expected from the received transmission. The second block code may comprise a first sub-code for the first information and a second sub-code for the second information. The first sub-code may correspond to the first block code.

The modules in FIGS. 9, 11, 13 and 15 may comprise processors, electronics devices, hardware devices, electronics components, logical circuits, memories, software codes, firmware codes, etc., or any combination thereof.

Figure 16:
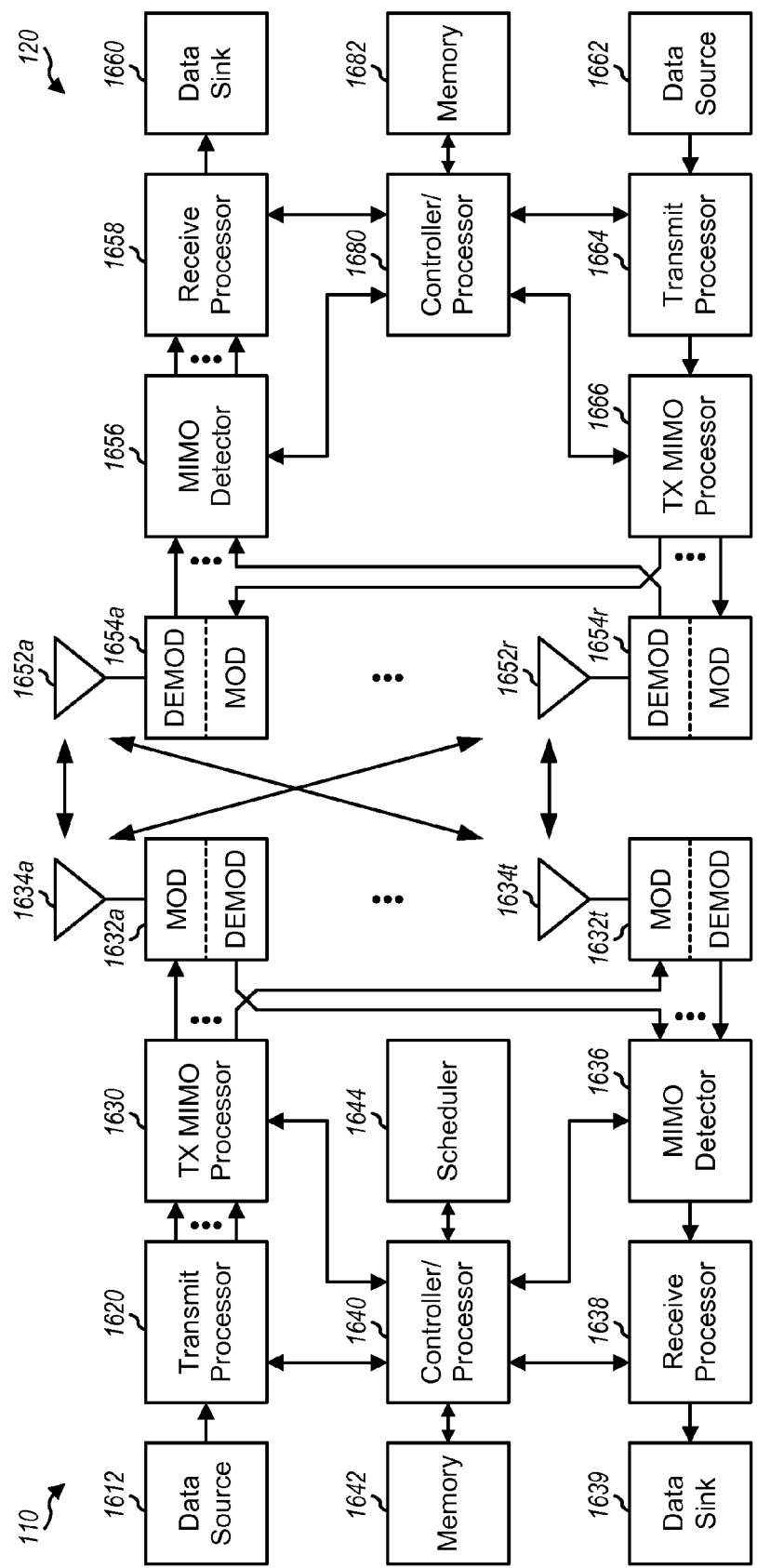
FIG. 16 shows a block diagram of a Node B and a UE.

FIG. 16 shows a block diagram of a design of a Node B 110 and a UE 120, which may be one of the Node Bs and one of the UEs in FIG. 1. In this design, Node B 110 is equipped with T antennas 1634a through 1634t, and UE 120 is equipped with R antennas 1652a through 1652r, where in general $T \geq 1$ and $R \geq 1$.

At Node B 110, a transmit processor 1620 may receive data for one or more UEs from a data source 1612, process (e.g., encode, interleave, and modulate) the data for each UE based on one or more transport formats selected for that UE, and provide data symbols for all UEs. Transmit processor 1620 may also process control information from a controller/processor 1640 and provide control symbols. A transmit (TX) multiple-input multiple-output (MIMO) processor 1630 may multiplex the data symbols, the control symbols, and/or pilot symbols. TX MIMO processor 1630 may perform spatial processing (e.g., preceding) on the multiplexed symbols, if applicable, and provide T output symbol streams to T modulators (MODs) 1632a through 1632t. Each modulator 1632 may process a respective output symbol stream (e.g., for OFDM) to obtain an output sample stream. Each modulator 1632 may further process (e.g., convert to analog, amplify, filter, and upconvert) the output sample stream to obtain a downlink signal. T downlink signals from modulators 1632a through 1632t may be transmitted via T antennas 1634a through 1634t, respectively.

At UE 120, antennas 1652a through 1652r may receive the downlink signals from Node B 110 and provide received signals to demodulators (DEMODs) 1654a through 1654r, respectively. Each demodulator 1654 may condition (e.g., filter, amplify, downconvert, and digitize) a respective received signal to obtain received samples. Each demodulator 1654 may further process the received samples (e.g., for OFDM) to obtain received symbols. A MIMO detector 1656 may obtain received symbols from all R demodulators 1654a through 1654r, perform MIMO detection on the received symbols if applicable, and provide detected symbols. A receive processor 1658 may process (e.g., demodulate, deinterleave, and decode) the detected symbols, provide decoded control information to a controller/processor 1680, and provide decoded data for UE 120 to a data sink 1660.

On the uplink, at UE 120, data from a data source 1662 and control information (e.g., CQI information, ACK information, etc.) from controller/processor 1680 may be processed by a transmit processor 1664, precoded by a TX MIMO processor 1666 if applicable, conditioned by modulators 1654a through 1654r, and transmitted to Node B 110. At Node B 110, the uplink signals from UE 120 may be received by antennas 1634, conditioned by demodulators 1632, processed by a MIMO detector 1636 if applicable, and further processed by a receive processor 1638 to obtain the data and control information transmitted by UE 120.

Controllers/processors 1640 and 1680 may direct the operation at Node B 110 and UE 120, respectively. Processor 1680 and/or other processors/modules at UE 120 (and also processor 1640 and/or other processors/modules at Node B 110) may perform or direct process 400 in FIG. 4, process 700 in FIG. 7, process 716 in FIG. 8, process 1000 in FIG. 10, and/or other processes for the techniques described herein. Processor 1640 and/or other modules at Node B 110 (and also processor 1680 and/or other processors/modules at UE 120) may perform or direct process 500 in FIG. 5, process 1200 in FIG. 12, process 1400 in FIG. 14, and/or other processes for the techniques described herein. Memories 1642 and 1682 may store data and program codes for Node B 110 and UE 120, respectively. A scheduler 1644 may schedule UEs for downlink and/or uplink transmission and may provide assignments of resources for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of sending information in a communication system, comprising:
 mapping first information to M most significant bits (MSBs) of a message, where M is one or greater;
 mapping second information to N least significant bits (LSBs) of the message when the second information is to be sent with the first information, where N is one or greater;
 encoding the message with a block code to obtain an output bit sequence, wherein encoding the message comprises:
  encoding K bits of the message with K basis sequences of the block code to obtain K encoded basis sequences, where K equals M plus N; and
  combining the K encoded basis sequences using modulo-2 addition to obtain the output bit sequence; and
 sending the output bit sequence on a channel.

2. The method of claim 1, wherein encoding the message with the block code comprises
 encoding the M MSBs of the message with first M basis sequences of the K basis sequences; and
 encoding the N LSBs of the message with next N basis sequences of the K basis sequences.

3. The method of claim 1, wherein the first information comprises channel quality indicator (CQI) information and the second information comprises acknowledgement (ACK) information.

4. The method of claim 1, further comprising:
 setting each of N acknowledgement (ACK) bits to a first value for an ACK or to a second value for a negative acknowledgement (NACK), wherein the second value is also used for discontinuous transmission (DTX) of the ACK information, and wherein the second information comprises the N ACK bits.

5. The method of claim 1, wherein the block code is derived based on a Reed-Muller code.

6. An apparatus for communication, comprising:
 at least one processor configured to:
  map first information to M most significant bits (MSBs) of a message, where M is one or greater;
  map second information to N least significant bits (LSBs) of the message when the second information is to be sent with the first information, where N is one or greater;
  encode the message with a block code to obtain an output bit sequence, wherein the message is encoded by:
   encoding K bits of the message with K basis sequences of the block code to obtain K encoded basis sequences, where K equals M plus N; and
   combining the K encoded basis sequences using modulo-2 addition to obtain the output bit sequence; and
  send the output bit sequence over a channel; and
 a memory coupled to the at least one processor.

7. The apparatus of claim 6, wherein the at least one processor is configured to encode the M MSBs of the message with first M basis sequences of the K basis sequences, and to encode the N LSBs of the message with next N basis sequences of the K basis sequences.

8. The apparatus of claim 6, wherein the at least one processor is configured to set each of N acknowledgement (ACK) bits to a first value for an ACK or to a second value for a negative acknowledgement (NACK), wherein the second value is also used for discontinuous transmission (DTX) of the ACK information, and wherein the second information comprises the N ACK bits.

9. An apparatus for communication, comprising:
 means for mapping first information to M most significant bits (MSBs) of a message, where M is one or greater;
 means for mapping second information to N least significant bits (LSBs) of the message when the second information is to be sent with the first information, where N is one or greater;
 means for encoding the message with a block code to obtain an output bit sequence, wherein the means for encoding the message comprises:
  means for encoding K bits of the message with K basis sequences of the block code to obtain K encoded basis sequences, where K equals M plus N; and
  means for combining the K encoded basis sequences using modulo-2 addition to obtain the output bit sequence; and
 means for sending the output bit sequence on a channel.

10. The apparatus of claim 9, wherein the means for encoding the message with the block code comprises
 means for encoding the M MSBs of the message with first M basis sequences of the K basis sequences, and
 means for encoding the N LSBs of the message with next N basis sequences of the K basis sequences.

11. The apparatus of claim 9, further comprising:
 means for setting each of N acknowledgement (ACK) bits to a first value for an ACK or to a second value for a negative acknowledgement (NACK), wherein the second value is also used for discontinuous transmission (DTX) of the ACK information, and wherein the second information comprises the N ACK bits.

12. A computer program product, comprising:
 a non-transitory computer-readable medium comprising:
  code for causing the at least one computer to map first information to M most significant bits (MSBs) of a message, where M is one or greater;
  code for causing the at least one computer to map second information to N least significant bits (LSBs) of the message when the second information is to be sent with the first information, where N is one or greater;
  code for causing the at least one computer to encode the message with a block code to obtain an output bit sequence, wherein the code for causing the at least one computer to encode the message comprises:
   code for causing the at least one computer to encode K bits of the message K basis sequences of the block code to obtain K encoded basis sequences, where K equals M plus N; and
   code for causing the at least one computer to combine the K encoded basis sequences using modulo-2 addition to obtain the output bit sequence; and
  code for causing the at least one computer to send the output bit sequence on a channel.

13. The computer program product of claim 12, wherein the computer-readable medium further comprises code for causing the at least one computer to set each of N acknowledgement (ACK) bits to a first value for an ACK or to a second value for a negative acknowledgement (NACK), wherein the second value is also used for discontinuous transmission (DTX) of the ACK information, and wherein the second information comprises the N ACK bits.

14. A method of sending information in a communication system, comprising:

mapping channel quality indicator (CQI) information to M most significant bits (MSBs) of a message, where M is one or greater;
mapping acknowledgement (ACK) information to N least significant bits (LSBs) of the message when the ACK information is to be sent with the CQI information, where N is one or greater;
encoding the message with a block code to obtain an output bit sequence, wherein encoding the message comprises:
encoding the M MSBs of the message with first M basis sequences of the block code to obtain M encoded basis sequences;
encoding the N LSBs of the message with next N basis sequences of the block code when the ACK information is to be sent with the CQI information to obtain N encoded basis sequences; and
combining the M and N encoded basis sequences to obtain the output bit sequence; and
sending the output bit sequence on a channel.

15. The method of claim 14, wherein the message comprises M plus N bits and is encoded with the first M plus N basis sequences of the block code if both CQI and ACK information are sent.

16. The method of claim 14, further comprising:
setting each of N ACK bits to a first value for an ACK or to a second value for a negative acknowledgement (NACK), wherein the second value is also used for discontinuous transmission (DTX) of the ACK information, and wherein the ACK information comprises the N ACK bits.

17. The method of claim 14, wherein the channel is a physical uplink control channel (PUCCH).

18. A method of receiving information in a communication system, comprising:
receiving a transmission comprising an encoded message, wherein the encoded message is encoded by:
encoding K bits of a message with K basis sequences of a block code to obtain K encoded basis sequences; and
combining the K encoded basis sequences using modulo-2 addition to obtain an output bit sequence of the encoded message;
decoding the received transmission based on the block code to obtain a decoded message comprising multiple bits;
providing M most significant bits (MSBs) of the decoded message as first information when at least the first information is expected, where M is one or greater; and
providing N least significant bits (LSBs) of the decoded message as second information when at least the second information is expected with the first information, where N is one or greater and K equals M plus N.

19. The method of claim 18, wherein the decoding the received transmission comprises decoding the received transmission based on first M plus N basis sequences of the block code to obtain the decoded message, wherein the M MSBs of the decoded message are obtained based on the first M basis sequences of the block code, and wherein the N LSBs of the decoded message are obtained based on the next N basis sequences of the block code.

20. The method of claim 18, wherein the first information comprises channel quality indicator (CQI) information and the second information comprises acknowledgement (ACK) information.

21. The method of claim 18, wherein the block code is derived based on a Reed-Muller code.

22. An apparatus for communication, comprising:
at least one processor configured to:
receive a transmission comprising an encoded message, wherein the encoded message is encoded by:
encoding K bits of a message with K basis sequences of a block code to obtain K encoded basis sequences; and
combining the K encoded basis sequences using modulo-2 addition to obtain an output bit sequence of the encoded message;
decode the received transmission based on the block code to obtain a decoded message comprising multiple bits;
provide M most significant bits (MSBs) of the decoded message as first information when at least the first information is expected, where M is one or greater; and
provide N least significant bits (LSBs) of the decoded message as second information when at least the second information is expected with the first information, where N is one or greater and K equals M plus N; and
a memory coupled to the at least one processor.

23. The apparatus of claim 22, wherein the at least one processor is configured to decode the received transmission based on first M plus N basis sequences of the block code to obtain the decoded message, wherein the M MSBs of the decoded message are obtained based on the first M basis sequences of the block code, and wherein the N LSBs of the decoded message are obtained based on the next N basis sequences of the block code.

24. The apparatus of claim 22, wherein for each bit among the N LSBs of the decoded message, the at least one processor is configured to provide an acknowledgement (ACK) if the bit has a first value, and to provide a negative acknowledgement (NACK) if the bit has a second value, the second value also being used for discontinuous transmission (DTX) of the ACK information.

25. A method of receiving information in a communication system, comprising:
receiving a transmission comprising an encoded message, wherein the encoded message is encoded by:
encoding K bits of a message with K basis sequences of a block code to obtain K encoded basis sequences; and
combining the K encoded basis sequences using modulo-2 addition to obtain an output bit sequence of the encoded message;
decoding the received transmission based on the K basis sequences of the block code to obtain a decoded message comprising multiple bits;
providing M most significant bits (MSBs) of the decoded message, obtained based on the first M basis sequences of the block code, as channel quality indictor (CQI) information when at least the CQI information is expected, where M is one or greater; and
providing N least significant bits (LSBs) of the decoded message, obtained based on the next N basis sequences of the block code, as acknowledgement (ACK) information when at least the ACK information is expected with the CQI information, where N is one or greater and K equals M plus N.

26. The method of claim 25, wherein the received transmission comprises a first output bit sequence if only CQI information is sent and comprises a second output bit sequence if both CQI and ACK information are sent, the first output bit sequence being obtained by encoding M bits of the CQI information with the first M basis sequences of the block code, and the second output bit sequence being obtained by encoding M bits of the CQI information with the first M basis sequences of the block code and encoding N bits of the ACK information with the next N basis sequences of the block code.

27. The method of claim 25, further comprising:
for each bit among the N LSBs of the decoded message,
providing an ACK if the bit has a first value, and
providing a negative acknowledgement (NACK) if the bit has a second value, the second value also being used for discontinuous transmission (DTX) of the ACK information.

28. An apparatus for communication, comprising:
means for receiving a transmission comprising an encoded message, wherein the encoded message is encoded by:
encoding K bits of a message with K basis sequences of a block code to obtain K encoded basis sequences; and
combining the K encoded basis sequences using modulo-2 addition to obtain an output bit sequence of the encoded message;
means for decoding the received transmission based on the block code to obtain a decoded message comprising multiple bits;
means for providing M most significant bits (MSBs) of the decoded message as first information when at least the first information is expected, where M is one or greater; and
means for providing N least significant bits (LSBs) of the decoded message as second information when at least the second information is expected with the first information, where N is one or greater and K equals M plus N.

29. The apparatus of claim 28, wherein the means for decoding decodes the received transmission based on first M plus N basis sequences of the block code to obtain the decoded message, wherein the M MSBs of the decoded message are obtained based on the first M basis sequences of the block code, and wherein the N LSBs of the decoded message are obtained based on the next N basis sequences of the block code.

30. A computer program product, comprising:
a non-transitory computer-readable medium comprising:
code for causing the at least one computer to receive a transmission comprising an encoded message, wherein the encoded message is encoded by:
encoding K bits of a message with K basis sequences of a block code to obtain K encoded basis sequences; and
combining the K encoded basis sequences using modulo-2 addition to obtain an output bit sequence of the encoded message;
code for causing the at least one computer to decode the received transmission based on the block code to obtain a decoded message comprising multiple bits;
code for causing the at least one computer to provide M most significant bits (MSBs) of the decoded message as first information when at least the first information is expected, where M is one or greater; and
code for causing the at least one computer to provide N least significant bits (LSBs) of the decoded message as second information when at least the second information is expected with the first information, where N is one or greater and K equals M plus N.

31. The computer program product of claim 30, wherein the code for causing the at least one computer to decode decodes the received transmission based on first M plus N basis sequences of the block code to obtain the decoded message, wherein the M MSBs of the decoded message are obtained based on the first M basis sequences of the block code, and wherein the N LSBs of the decoded message are obtained based on the next N basis sequences of the block code.

* * * * *